Oct. 11, 1949.  H. G. TREISS, JR  2,484,391
COMBINED LIQUID DISPENSER, ICE CRUSHER AND DRINK MIXER
Filed Sept. 11, 1947  2 Sheets-Sheet 2
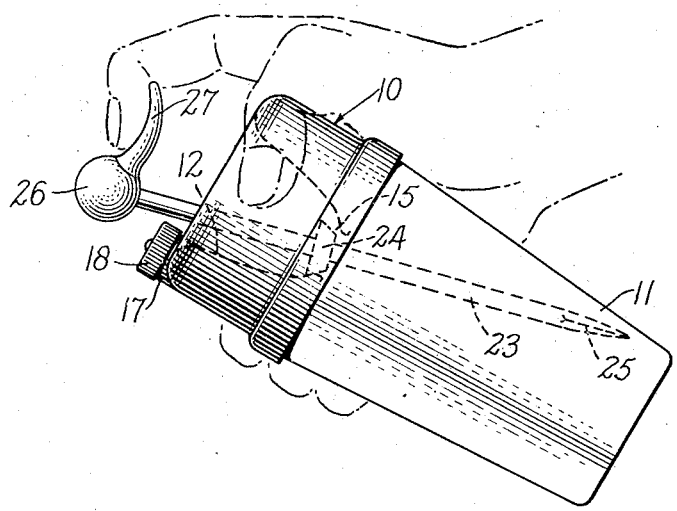
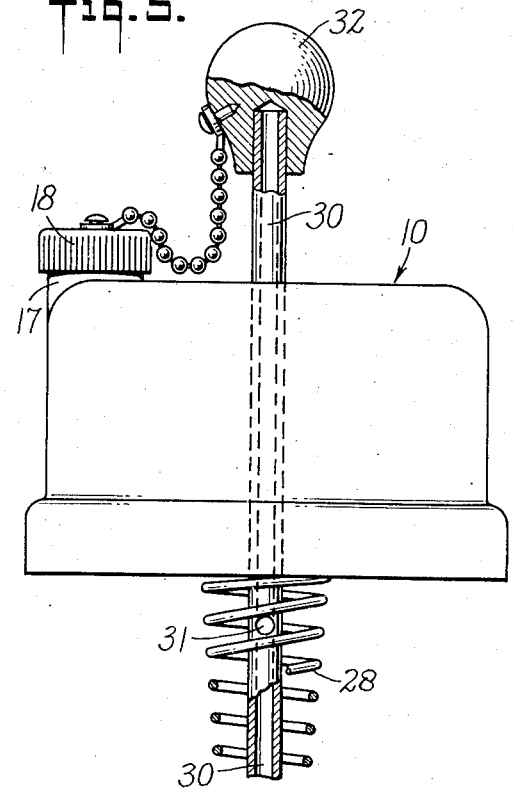
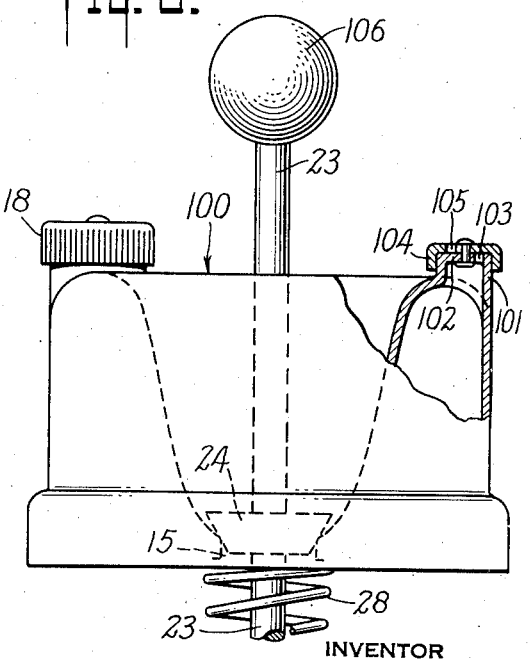
INVENTOR
*Herman G. Treiss, Jr.*
BY
ATTORNEYS Patented Oct. 11, 1949

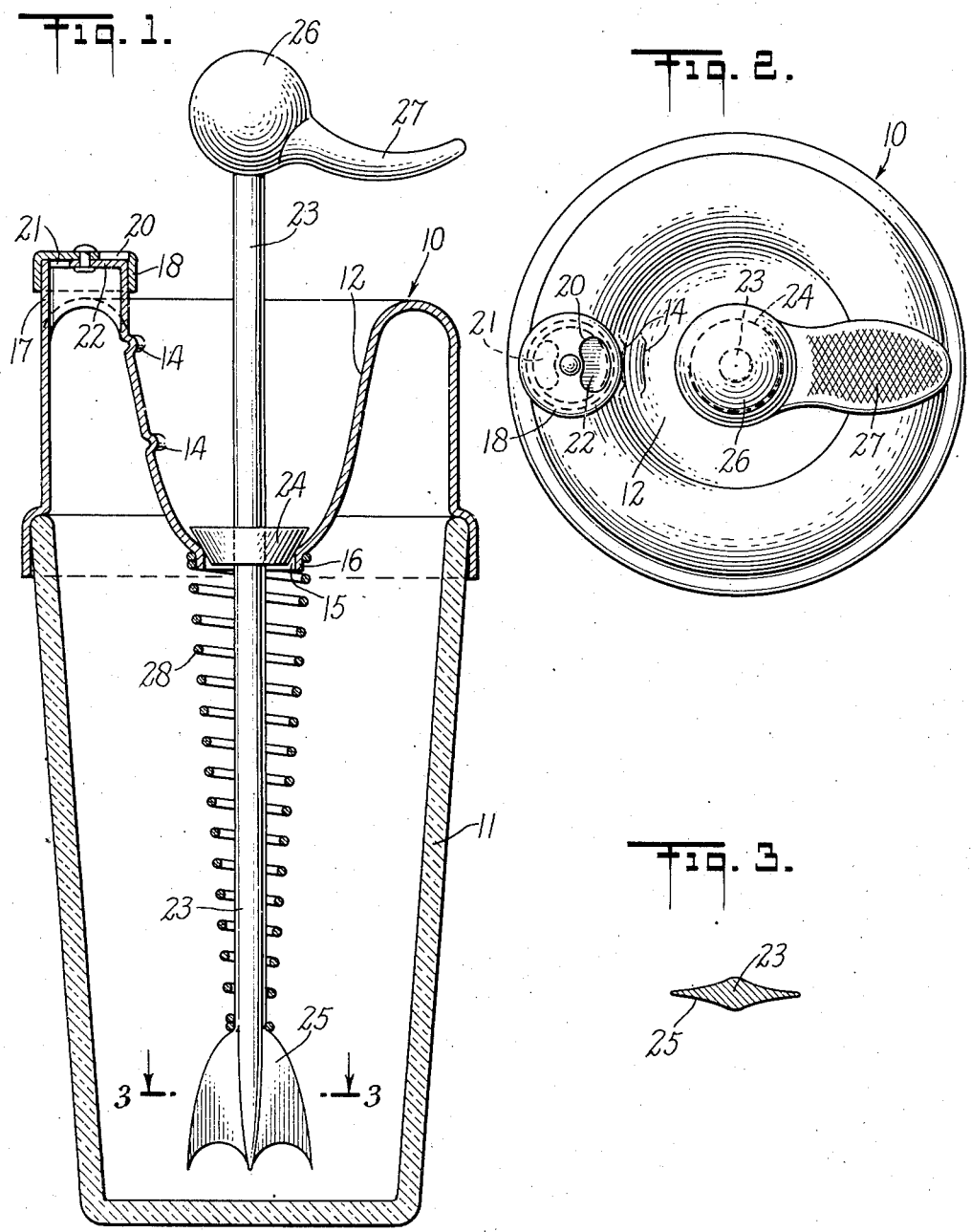

2,484,391

UNITED STATES PATENT OFFICE 2,484,391

COMBINED LIQUID DISPENSER, ICE CRUSHER, AND DRINK MIXER

Herman G. Treiss, Jr., Brooklyn, N. Y., assignor to Associated Development and Research Corporation, New York, N. Y., a corporation of New York Application September 11, 1947, Serial No. 773,380

6 Claims. (Cl. 241—101)

This invention relates to an improved device for the preparation of chilled or mixed drinks.

It is well known that in preparing cocktails and other mixed drinks the proper proportion of the respective ingredients, and the mixture or blending thereof, are important. Some recipes call for shaking the ingredients with cubed or chopped ice, whereas in others the ingredients are best stirred or blended without violent agitation.

It is an object of the invention to provide a cap-like device to be fitted over a glass or other container in which the drink is to be prepared, said device including measuring-cup means from which the measured ingredients are drained into the glass, ice-breaking and drink stirring means, and a closure for the drainage opening of the measuring cup; said closure being operable, during the pouring of the mixed drink, to admit air into the container.

It is a further object of the invention to provide a drink mixing device having an air vent which is normally closed but which may be readily opened incident to the pouring of the mixed drinks from a container to admit air thereinto.

It is another object of the invention to provide a drink mixer of attractive design and low manufacturing cost which will convert any suitable glass or like container into a highly efficient shaker or blender for mixed drinks.

A presently preferred embodiment of the invention comprises a cap suitable for placing on a glass such as a "bar" glass or the like. Said cap is provided with a pouring spout having a suitable closure. The central portion of said cap is formed to provide a cup along the walls of which there are placed suitable guiding marks to assist in measuring the various ingredients of the drink. An opening in the bottom of said cup discharges into the glass. Extending through said opening and provided with a stopper or valve adapted to seal said opening, there is a rod or shaft which has at its lower end an ice breaker, and at its upper end presents a handle or finger piece disposed suitably above the cap. Suitable spring means may be employed to hold the stopper in normally closed position.

If the drink is to be frappeed, ice is placed in the glass, and the ice-breaker shaft moved sharply up and down to cause the ice breaker to reduce the pieces of ice to desired size. After the ingredients have been measured and drained into the glass, the assembly may be grasped and the contents shaken; or if the recipe calls merely for stirring the drink, the handle may be swung or turned so that the ice breaker blades stir the ingredients in the presence of the ice to insure proper blending and chilling thereof.

When the drink is ready to be poured the cap is left in position on the glass and the rod and the thereon positioned stopper is tilted so that the stopper rocks upwardly to provide a small arcuate air passage at the drainage opening of the measuring cup. Then with the rod held in such position by finger pressure the contents of the glass may be poured through the spout with which the cap is provided. By controlling the size of the air inlet opening, the rate of discharge from the spout may be regulated as desired.

Modified forms of the invention contemplate providing the cap with a separate air intake, or utilizing a hollow shaft rather than a solid rod for the stirring and ice breaking structure, said hollow shaft being provided with means whereby air may be introduced into the glass during the pouring of the liquid therefrom.

Other features and advantages will become apparent from the following description of the invention and a study of the drawings in which Fig. 1 is a vertical sectional elevation of one form of the invention mounted on a glass;

Fig. 2 is a top plan view thereof;

Fig. 3 is a section through the ice breaker blades, taken on lines 3—3 of Fig. 1;

Fig. 4 is a view showing the Fig. 1 embodiment and the manner in which air is admitted to the glass during pouring of the liquid from the glass; and Figs. 5 and 6 show modified forms of air-admission means.

Referring to the drawings for a more complete description of the invention, the device includes a cap 10 which is adapted to be placed over the end of any suitable glass or container 11. The cap is formed with a rather high rim which defines a central cup or measuring compartment 12. The wall of the cup is desirably formed, or provided with lines or other markings 14 which afford means of accurately measuring the ingredients of the drink. For example, the lines may represent fractions of a fluid ounce, fractions of a standard "jigger," or the like. The cup is provided with a drainage opening 15 having a short neck 16.

I prefer to provide the cap with a short neck or spout 17 the end of which rotatably supports a closure 18 having a relatively small opening 20 which may register with a similar opening 21 in the wall 22 which bridges the spout 17. By rotation of the cap 18 the opening 21 may be closed or exposed as desired.

A rod 23 is provided with a stopper or valve plug 24 for cooperation with the opening 15. It will be noted that the rod is appreciably smaller than the opening 15 and hence may be freely moved or rotated therein. At one end the rod terminates in a two-bladed chopper 25 and at its other end has a knob or handle 26 desirably having a finger piece or extension 27. The advantage of the two-bladed chopper is that it may be worked down between pieces of ice whereas a multi-bladed chopper would rest on the surface thereof. Desirably a coiled spring 28 is disposed about the shaft 23 and bears between the neck 16 and the ice chopper blades so as to hold the closure 24 in normally closed position on the opening 15. I prefer to locate the plug 24 so that the bottom edge of the blades 25 are normally disposed about ½" above the bottom of the glass.

Ice which has been placed within the receptacle 11 may be broken by placing the cap 10 thereon and then grasping the handle 26 to move the rod and its associated breaker blades smartly up and down against the ice cubes or the like. After the ice has been reduced to the desired size the ingredients of the drink may be individually measured in the cup 12, the plug being then in seated position. Then by liftting upwardly on the handle 26 to raise the plug above the seat 16 the respective ingredients may be emptied into the glass. Assuming all of the ingredients to have been measured and emptied into the glass 11 the mixture may be violently shaken as is conventional in using a cocktail shaker. In so doing the glass should be grasped at its bottom, with the other hand pressing firmly against the handle and cap to hold the valve 24 in seated position.

If, on the other hand, the drink is merely to be stirred, the handle 25 may be grasped and swung or rotated; the plug 24 acting as a pivot, whereupon the blades 25 function efficiently as stirring means.

In pouring the mixed drink, the glass and thereon positioned cap may be grasped as in Fig. 4, with the finger pressing on the member 27 to rock the shaft 23 about the plug 24 as a pivot. This will raise an edge of the plug above the rim of the drainage opening 15 to admit air to the glass. The spout openings 20, 21 are sufficiently small to make additional strainer means unnecessary.

The embodiment of Fig. 5 utilizes, in lieu of the solid rod 23, a tube 30 which has one or more side wall openings 31. Knob 32 fits frictionally over the open end of tube 30, and may be tethered to the closure 18 as shown. In pouring from the Fig. 5 device, the knob 32 is removed from tube 30, and air enters the glass through the open end of the tube and its side-wall openings. Spring 28 will hold the closure plug (not shown) in seated position.

In the Fig. 6 structure, the cap 100 has a short neck 101, the end wall 102 of which has a small air opening 103. The closure 104 is rotatably held on neck 101 and has an opening 105 which when the drink is to be poured, is brought into register with opening 103 for admission of air into the glass 11. Ice breaker rod 23 may be solid, as in Fig. 1, and handle 106 may be of any desired configuration.

Thus, among others, the several objects of the invention as afore noted are achieved. Obviously numerous changes in construction and rearrangement of the parts might be resorted to without departing from the spirit of the invention as defined by the claims.

I claim:
1. A drink-mixing accessory, comprising a cap to be placed on a container, said cap having a high wall portion defining a central cup-like structure having a drainage opening, said cap, also being provided with a pouring spout; a rod extending downwardly through said drainage opening; a closure plug for said opening carried by said rod; ice breaker means affixed to the lower end of said rod; a spring surrounding said rod and disposed between the under side of said cap and said ice breaker means for resiliently retaining said plug in said closed position; and a handle affixed to the opposite end of said rod, whereby the latter may be moved up and down to cause said ice breaker means to strike and break ice which may have been deposited in said container, or whereby optionally said rod may be inclined to raise an edge of said closure out of engagement with said drainage opening to admit air into said container during the pouring of the contents thereof through said pouring spout.

2. A device of the class described, including a cap to be placed on a container, said cap having a peripheral wall defining a central cup portion provided with a drainage opening communicating with said container, said cap having also a pouring spout; a rod extending downwardly through said drainage opening; a closure plug for said opening secured to said rod, said rod being of substantially smaller diameter than said drainage opening; a bladed structure carried by said rod at the lower end, thereof; and a handle affixed to the other end of said rod for optionally moving the same vertically within said container, or rotating said rod and thereto attached closure plug about the peripheral wall of said drainage opening as a pivot.

3. Beverage mixing means, including a cap to be placed on a container, said cap having a cup portion to receive ingredients of the beverage, said cup being provided with a drainage opening communicating with said container through which said ingredients may pass from said cup into said container; a rod extending downwardly into said container through said drainage opening, said rod being of substantially smaller diameter than said opening; a closure plug for said opening secured to said rod; combined stirring and ice breaking means secured to the lower end of said rod; and handle means in the opposite end of said rod.

4. A device according to claim 3, in which the cup portion is provided with means of measuring the ingredients placed therein.

5. Beverage-mixing means, comprising a cap to be placed on a receptacle, said cap having a pouring spout and an opening communicating with said receptacle; a tube extending freely through said opening and terminating in a bladed structure, said tube having an opening communicating with the interior of said receptacle; and a removable closure for the outer end of said tube, whereby upon removal of said closure air may flow through said tube and into said receptacle to facilitate the pouring of the contents thereof.

6. A beverage mixing accessory, comprising a cap to be placed on a receptacle, said cap having a pouring spout and a substantially central cup-like structure for receiving the ingredients of the beverage, said cup-like structure having an opening at the base thereof, a tubular shaft extending freely through said opening and terminating in a bladed structure, said tube having an opening communicating with the upper portion of said receptacle whereby said tubular shaft affords means of introducing air into said receptacle when the cap is placed thereon; a plug carried by said tube for closing said cup structure opening, and means for resiliently holding said plug in seated position.

HERMAN G. TREISS, Jr.

REFERENCES CITED

The following references are of record in the file of this patent:

UNITED STATES PATENTS

| Number | Name | Date |
| --- | --- | --- |
| D. 118,831 | Norris | Feb. 6, 1940 |
| 196,605 | Trepus | Oct. 30, 1877 |
| 302,483 | Haslage | July 22, 1884 |
| 1,306,319 | Tittle, Jr. | June 10, 1919 |
| 1,508,817 | Pfaehler et al. | Sept. 16, 1924 |
| 2,056,097 | Fegley et al. | Sept. 29, 1936 |

FOREIGN PATENTS

| Number | Country | Date |
| --- | --- | --- |
| 427,237 | Great Britain | Jan. 23, 1935 |
| 638,114 | France | Feb. 14, 1928 |